July 2, 1968    K. L. THEOBALD    3,390,796
TRAILER FOR LOADING, UNLOADING, AND MOVING HEAVY BULKY EQUIPMENT
Filed Dec. 27, 1966    2 Sheets-Sheet 1

INVENTOR.
K. LYLE THEOBALD
BY

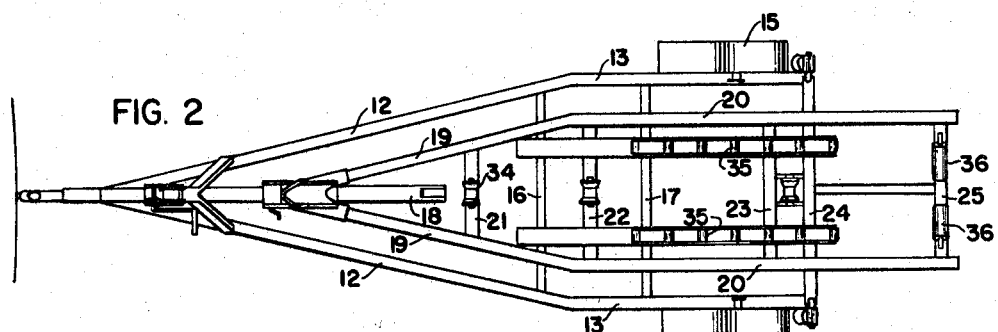

United States Patent Office 3,390,796
Patented July 2, 1968

3,390,796
TRAILER FOR LOADING, UNLOADING, AND MOVING HEAVY BULKY EQUIPMENT
Kermit L. Theobald, Rte. 1, Bozeman, Mont. 59715
Filed Dec. 27, 1966, Ser. No. 604,742
10 Claims. (Cl. 214—505)

ABSTRACT OF THE DISCLOSURE

A trailer having a base frame which is open at the rear with ground-engaging wheels mounted on the base frame and a movable load carrying frame movably mounted on a longitudinally disposed guide member diverging upwardly from the base frame and pivotally mounted by means of struts extending upwardly from the movable frame and pivotally connected to one end of telescoping spring members which have their other ends pivotally connected to the base frame adjacent the trailer wheels and rearwardly thereof whereby a bulky heavy object, such as a boat, a bulldozer, or the like, can be loaded with the movable frame engaging the ground a substantial distance rearwardly of the ground-engaging wheels and after the heavy bulky object is on the movable frame, the heavy bulky object and the movable frame are moved forwardly on the trailer lifting up the rear end of the movable frame and the heavy object to a carrying position between the ground-engaging wheels.

---

Briefly, the invention relates to the load-carrying vehicle and more particularly to a trailer having a movable frame adapted to be lowered and moved rearwardly for loading and unloading a heavy object, such as a boat, from a body of water, while keeping the wheels on solid ground either in the water or just out of the water and thereby avoid damaging the bearings of the wheels by immersing such bearings in the water.

The prior art includes many ways of loading a vehicle including movable ramps, pivoting supports of various kinds, including pivoting the vehicle about the axle of the supporting wheels, but none of these have been entirely satisfactory, particularly for loading and unloading a boat, and accordingly it is an object of the present invention to provide a vehicle which can be operated by one person for loading and unloading a heavy object such as a boat, a tractor, or the like, while maintaining the wheels on solid ground.

Other and further objects will be apparent as the description proceeds and upon reference to the accompanying drawings, wherein:

FIGURE 2 is a top plan view of the trailer in the load-carrying position;

FIGURE 3 is a side elevation showing a boat in phantom in load-carrying position;

FIGURE 4 is a top view of the trailer in loading position;

FIGURE 5 is a side elevation of the trailer in loading and unloading position showing a boat being loaded or unloaded adjacent the water's edge;

Figure 1:
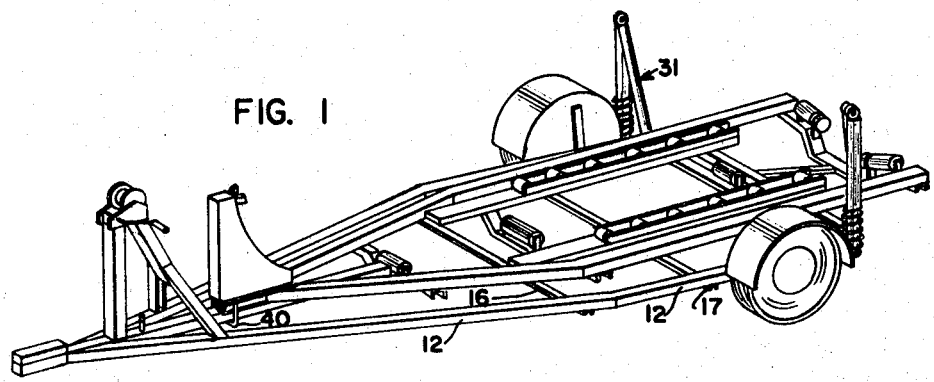
FIGURE 1 is a perspective view of the trailer according to the present invention in load-carrying position with the load removed.
Figure 6:
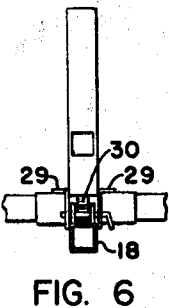
FIGURE 6 is a fragmentary section taken on line 6—6 of FIGURE 3 showing the locking bolt retaining the movable frame in load-carrying position.

Referring more particularly to the drawings, the trailer vehicle includes a hitch 10 for attachment to a vehicle 11 at the apex of a base frame including rearwardly diverging hollow square section members 12, 12 which merge with parallel sections 13, 13 to which ground-engaging wheels 14, 14 are rotatably mounted on suitable studs and are covered by fenders 15, 15. Cross members 16, 17 extending between the box frame members maintain them in proper position.

A longitudinally extending guide member 18 is fixed to the apex of the side frame members 12 and diverges upwardly from the plane thereof and receives the forward end of a load-carrying movably mounted frame formed of rearwardly diverging frame members 19, 19 merging into parallel frame members 20, 20 suitably held in spaced relation by cross brace members 21, 22, 23, 24 and 25, thereby completing the movable load-carrying frame. Fixed to the apex of the load-carrying frame is a boat bow engaging abutment 26 having a Y-shaped yoke 27 to engage the opposite sides of the boat 28 being carried. The bottom portion of abutment 26 includes sidewardly extending flanges and downwardly extending flanges of angle members 29, 29 secured to the abutment 26 and partially embracing the tongue 18 and rotatably supporting a roller 30 riding on the upper surface of the tongue 18, is rotatably mounted on a stub shaft 30A passing through the downwardly extending flanges of angles 29, 29.

A resilient action supporting strut 31 including an upper tubular section 31A and a lower tubular section 31B telescoping therein and connected by a rod 31C telescopingly received in a tube 31D which are connected at their respective free ends by pins 31E and 31F passing through the corresponding tubular section 31A and 31B with a compression spring 31G reacting between the rod 31C and the tube 31D to urge the sections 31A and 31B apart, suitable stop means being provided between the rod 31C and 41D to prevent complete separation. A compression spring 31H reacts between a tubular boss 31I at the bottom of section 31B and a collar 31J at the bottom of section 31A whereby the springs 31G and 31H forceably retain the tubular boss 31I projected away from the upper tubular boss 31K with sufficient force to carry approximately half the load of the boat on the movable frame.

Figure 7:
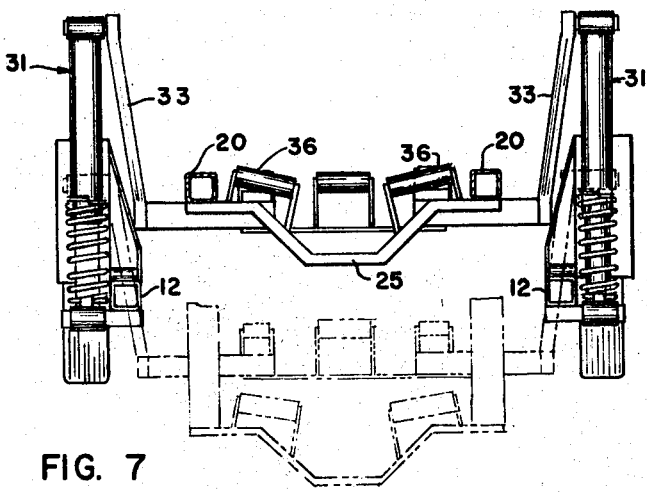
FIGURE 7 is an enlarged rear elevation of the trailer in load-carrying position with a phantom outline showing of the trailer in loading and unloading position.
Figure 8:
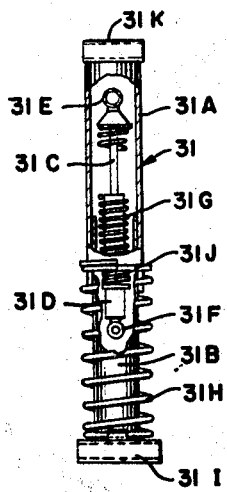
FIGURE 8 is an enlarged view of the telescoping load-carrying spring arrangement.

The telescoping struts 31, 31 are connected respectively to outwardly projecting studs 32 on the base frame rearwardly of the wheels 14 and the upper tubular boss 31K is pivotally connected to the upper end of a strut 33 extending upwardly from a lateral projection of the inverted arch-shaped brace 24, whereby the telescoping struts 31, 31 serve as links connecting the movable frame to the base frame for movement of the movable frame from the load-carrying position shown in FIGURES 1, 2, 3 and 7 to the loading and unloading positions shown in FIGURES 4, 5, and in dotted lines in FIGURE 7.

Suitable boat-supporting rollers 34 are provided for the keel of the boat and other rollers 35, 35 are provided for the sides of the boat, with inclined rollers 36, 36 for the stern of the boat, whereby the boat 28 can be moved onto the trailer when the trailer is positioned adjacent the water's edge, as shown in FIGURE 5, and the movable frame in its lowered position extending rearwardly and downwardly so the cross brace 25 may engage the bottom of the body of water. A windlass 37 operated by a suitable crank is mounted at the upper end of a tripod 38 secured to the base frame side members 12 and tongue 18 to apply tension to a line 39 connected to an eye on the boat 28, thereby drawing the boat so the bow thereof engages the abutment 26 with the Y-shaped yoke 27 embracing the sides of the bow and further movement after the boat abuts the abutment 26 causes the load carrying telescoping spring-pressed struts 31, 31 to move from the position shown in FIGURE 5 to the position shown in FIGURE 3, thereby raising the movable frame to the load-carrying position. The front end of the movable frame is effectively retained on the tongue 18 by a U-shaped member 40 extending between the horizontal flanges of angle members 29 and after the movable frame is in its load-carrying position, a retainer bolt 41 is passed through the vertical flanges of angles 29 and through the registering aperture in lug 41A extending upwardly from the tongue 18, thereby effectively providing a three-point support for the movable frame carrying the load whether such load is a boat 28 or other objects.

A tube 42, having a removable cap thereon, is provided on the tongue 18 to receive the registration certificate for the trailer.

It will be apparent that the spring-pressed struts 31 effectively support the load against bumps and other road shocks by individual suspension means and the arrangement of the struts 33 with respect to the telescoping resilient struts 31, 31 effectively guide the movable frame and the load thereon during all of the operations described above.

It will be apparent that the load-carrying frame could include a platform for carrying any type of load even though the specific showing includes a shape which is particularly desirable for a boat with rounded sides and a relatively deep keel.

The telescoping struts 31 engage their supporting pivots outwardly of the frame members 13 thereby tending to maintain the frame member against twisting which might be caused by the reaction of the stub shaft mounted on the underside of the frame member 13 and carrying the wheel 14 and the section of the frame between the stub shaft carrying the wheel and the pivot shaft 32 will be reinforced to obtain the desired strength without excessive weight.

It will be apparent that changes may be made within the spirit of the invention as defined by the valid scope of the claims.

What is claimed is:

1. A vehicle for loading, unloading and carrying a heavy load without moving the ground engaging means thereof objectionably close to the load during loading and unloading whereby a load of heavy mass can be located adjacent soft ground comprising a base frame having side frame members and ground engaging members thereon for movement over the ground and means for moving the vehicle along the ground, a load carrying frame extending toward the other end, resilient supportdinal and vertical movement, a longitudinally disposed guide member mounted adjacent one end of the base frame etxending toward the other end, resilient supporting means pivotally mounted at one end to said base frame adjacent said ground engaging means, a strut extending upwardly from said movable frame and pivotally connected to the other end of said resilient supporting means, and means for supporting a heavy load on said movable frame, said base frame being open adjacent said ground engaging members and said movable frame being receivable in the space between said side frame members of said base frame adjacent said ground engaging means whereby when the movable frame is moved rearwardly from a position where the pivots of said resilient supporting members lie in a substantially perpendicular plane to a position where said resilient supporting members are inclined toward said other end of the vehicle the other end of said movable frame moves so the other end thereof engages the ground for loading and unloading, and means to move said movable frame from its loading and unloading position to its load carrying position.

2. The invention according to claim 1 in which the ground-engaging means are wheels rotatably mounted on stub shafts extending outwardly from the base frame and the resilient supporting means are pivotally mounted outwardly of the base frame and adjacent the other end of the base and in the plane of the wheel whereby the strains on the base frame are effectively balanced.

3. The invention according to claim 1 in which the movable frame includes a plurality of inverted arch-shaped cross members for receiving a load having a convex bottom such as a boat whereby the ground-engaging means can be positioned adjacent the shoreline and the movable frame arranged to extend outwardly from the wheels a subtantial distance into the body of water thereby reducing the work required to load the boat and to move the movable frame to its load-carrying position.

4. The invention according to claim 1 in which an abutment is provided adjacent the one end of the longitudinally movable frame for engagement by a load and the means to move the movable frame to load-carrying position is a windlass having a line connectable to the load.

5. The invention according to claim 1 in which the resilient supporting means includes a pair of telescoping tubular members with a compression spring reacting between said tubular members to carry the load of the movable frame.

6. The invention according to claim 5 in which a rod is fixed to one of said tubular members and a sleeve is fixed to the other of said tubular members with stop means to prevent complete separation thereof and a second spring reacting between said rod and said sleeve to additionally control the load carried by said vehicle.

7. The invention according to claim 1 in which the movable frame has rollers for movably supporting the load thereon.

8. The invention according to claim 1 in which a closable tube is mounted on said longitudinally disposed guide member for carrying identification material.

9. The invention according to claim 1 in which the movable frame has cooperating flanges for guiding engagement with the longitudinally exposed guide member with a roller mounted on such flanges for supporting the said one end of the movable frame on said guide member and a locking bolt is provided to extend through said flanges and cooperate with an apertured lug fixed on said guide member.

10. The invention according to claim 1 in which the proportions are such that when the movable frame is in its loading and unloading position the said other end of said movable frame is supported on the ground.

References Cited

UNITED STATES PATENTS 2,835,400   5/1958   Latzke _____ 214—505 X
3,028,982   4/1962   Ahlberg _____ 214—505 X ALBERT J. MAKAY, *Primary Examiner.*